(12) United States Patent
Bharadwaj (10) Patent No.: US 10,273,600 B1
(45) Date of Patent: Apr. 30, 2019

(54) DEVICES HAVING FABRIC WITH ADJUSTABLE APPEARANCE

(71) Applicant: Apple Inc., Cupertino, CA (US)

(72) Inventor: Shravan Bharadwaj, San Jose, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 15/685,862

(22) Filed: Aug. 24, 2017

(51) Int. Cl.
| | |
|---|---|
| *D03D 1/00* | (2006.01) |
| *D02G 3/44* | (2006.01) |
| *F21V 8/00* | (2006.01) |
| *A41D 27/08* | (2006.01) |
| *G02F 1/1516* | (2019.01) |

(52) U.S. Cl.
CPC ........... *D03D 1/0088* (2013.01); *D02G 3/441* (2013.01); *G02B 6/001* (2013.01); *A41D 27/085* (2013.01); *G02F 1/15165* (2019.01)

(58) Field of Classification Search
USPC ........................................................ 362/104
See application file for complete search history.

(56) References Cited

U.S. PATENT DOCUMENTS

| | | | |
|---|---|---|---|
| 5,445,608 A | 8/1995 | Chen et al. | |
| 5,485,355 A * | 1/1996 | Voskoboinik | H05B 33/00 313/358 |
| 6,846,094 B2 * | 1/2005 | Luk | H05B 33/0857 362/240 |
| 7,785,496 B1 | 8/2010 | Shim et al. | |
| 8,769,836 B2 | 7/2014 | Donovan et al. | |
| 9,644,313 B2 | 5/2017 | Sotzing | |
| 2010/0245971 A1 | 9/2010 | Sotzing et al. | |
| 2012/0224247 A1 * | 9/2012 | Sotzing | H01M 4/02 359/265 |
| 2014/0011004 A1 | 1/2014 | Sotzing et al. | |
| 2017/0130906 A1 | 5/2017 | Jiang et al. | |

* cited by examiner

*Primary Examiner* — Rafferty D Kelly
(74) *Attorney, Agent, or Firm* — Treyz Law Group, P.C.; G. Victor Treyz; Kendall W. Abbasi (57) ABSTRACT

An electronic device may include intertwined strands of material such as strands forming fabric. A strand in the fabric may include a light-emitting core surrounded by a coaxial light modulator layer. The light-emitting core may be formed from an optical fiber, light-emitting diodes mounted to a polymer core, or a layer of light-emitting diodes sandwiched between coaxial inner and outer conductive layers. The light modulator layer may have coaxial transparent inner and outer electrodes and may have a light modulating material such as electrochromic material, liquid crystal material, or other material that exhibits optical properties such as color and/or light transmission that can be electrically controlled.

20 Claims, 8 Drawing Sheets

DEVICES HAVING FABRIC WITH ADJUSTABLE APPEARANCE

FIELD

This relates generally to fabric-based items and, more particularly, to fabric-based items having adjustable components.

BACKGROUND

It may be desirable to form bags, furniture, clothing, wearable electronic devices, and other items from materials such as fabric. If care is not taken, however, fabric-based items may not offer desired features. For example, fabric-based items may not include visual output devices to provide a user with visual information or may include visual output devices that are unattractive, bulky, and heavy.

SUMMARY

An electronic device may have intertwined strands of material. The intertwined strands may form fabric. The appearance of portions of the fabric can be adjusted using control circuitry that controls adjustable strands within the fabric.

An adjustable strand may include a light-emitting core. The light-emitting core may be formed from an optical fiber that is provided by light from a light-emitting diode, light-emitting diodes mounted to a dielectric core, or a layer of light-emitting diodes sandwiched between coaxial inner and outer conductive layers. The control circuitry can adjust light-emitting diodes associated with adjustable strands to adjust light emission from the adjustable strands.

The light-emitting core of an adjustable strand may be surrounded by a coaxial light modulator layer. The light modulator layer may have transparent coaxial inner and outer electrodes and may have a light modulating material interposed between the inner and outer electrodes. The light modulating material may be a material such as electrochromic material, liquid crystal material, or other material that exhibits optical properties such as color and/or light transmission that can be electrically controlled by the control circuitry.

DETAILED DESCRIPTION

Electronic devices such as wearable devices and other items may include fabric structures. To provide the fabric structures with an adjustable appearance, strands of material in the fabric may include electrically adjustable light sources and/or electrically adjustable light modulators. For example, strands can include light-emitting diodes for emitting light and/or can include electrically adjustable materials (e.g., electrochromic inks, liquid crystals with dye, etc.) that exhibit an electrically adjustable appearance.

Control circuitry in a device may adjust the appearance of entire strands or large portions of strands (e.g., when it is desired to change the appearance of relatively large areas of a fabric item) and/or may be used in adjusting pixel-sized areas (e.g., when it is desired to display images on a portion of a fabric layer). In some configurations, the appearance of strands of material may be adjusted to adjust illumination that is being provided by the strands (e.g., interior bag lighting, etc.). Light modulator structures may, in some arrangements, adjust the color of emitted light. Light modulator structures may also be used in selectively dimming uniform light emitted from core structures.

Arrangements such as these may be used to adjust the visual appearance of fabric-based items, to display images, to illuminate logos, keyboard key symbols and other patterned areas, and/or to otherwise adjust the appearance of fabric in a wearable electronic device or other item with fabric.

Figure 1:
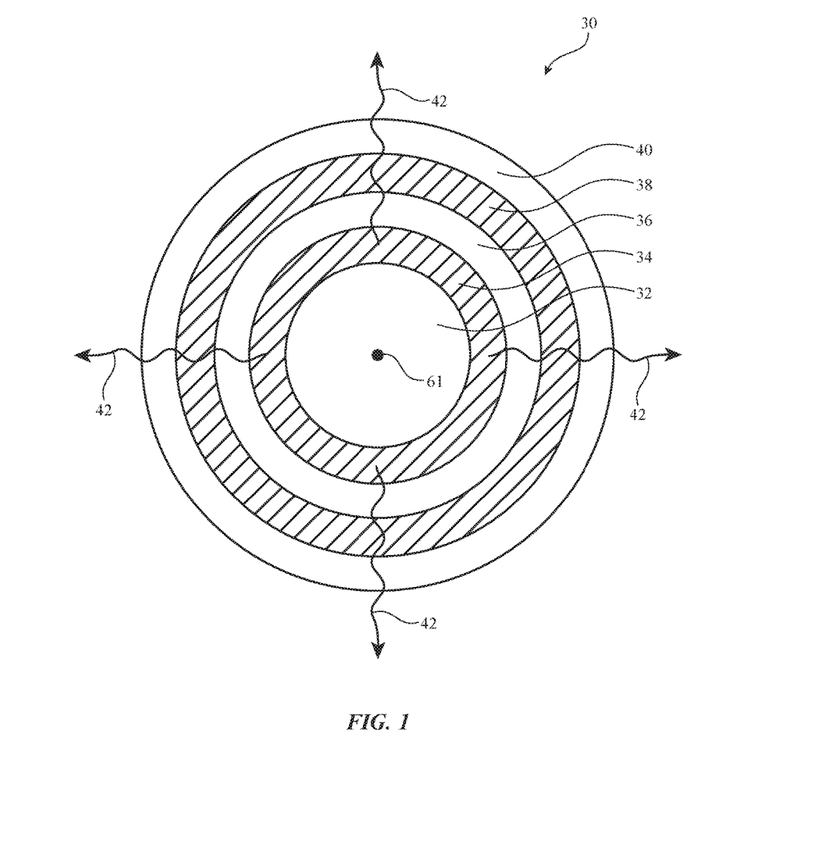
FIG. 1 is a cross-sectional view of an illustrative illuminated strand with an adjustable appearance in accordance with an embodiment.

A cross-sectional view of an illustrative strand with an adjustable appearance is shown in FIG. 1. In the example of FIG. 1, strand 30 is a monofilament. Multifilament strands (yarn) may be used in forming fabric, if desired.

As shown in FIG. 1, strand 30 may include a light-emitting core (core strand) such as core 32. Core 32 may emit light 42 such as white light or light of non-neutral color(s) such as red light, green light, blue light, etc. In some configurations, core 32 may emit ultraviolet light or infrared light. Arrangements in which light 42 is white light may sometimes be described herein as an example.

The appearance of light 42 and therefore the outward appearance of strand 30 to an observer may be varied by modulating the color and/or intensity of light 42 with one or more light modulating layers surrounding core 32. In general, any suitable light modulating structures may be incorporated into device 10. With one illustrative arrangement, strand 30 includes a light modulator (light modulator layer) based on electrochromic technology. With another illustrative arrangement, the light modulator layer in strand 30 is based on liquid crystal light modulator technology. Other types of light modulators may be incorporated into strand 30, if desired.

The light modulator structures in strand 30 may be adjusted by applying controlled electrical signals to electrodes in strand 30. The electrodes may be formed on opposing sides of strand 30 (e.g., on left and right sides of strand 30 in the orientation of FIG. 1) or may be formed in a coaxial arrangement.

In the example of FIG. 1, strand 30 includes coaxial electrodes such as inner electrode 34 and outer electrode 38. Inner electrode 34 surrounds light-emitting core 32. Outer electrode 38 surrounds inner electrode 34 in a coaxial fashion. A layer of light modulator material 36 is interposed between inner electrode 34 and outer electrode 38. In this configuration, core 32, inner electrode 34, material 36, and outer electrode 38 are all concentric. Strand 30 of FIG. 1 has a longitudinal axis 61 that extends into the page.

Light modulator material 36 (e.g., electrochromic material, liquid crystal material, etc.) and electrodes 34 and 38 form an electrically adjustable light modulator. The signal applied to layer 36 when control circuitry 14 applies a signal across electrodes 34 and 38 adjusts the optical properties of layer 36 (e.g., light transmission, color, etc.) and thereby adjusts the intensity and color of emitted light 42. Light 42 may also be adjusted using electrically adjustable components (e.g., light-emitting diodes) associated with core 32.

To allow light 42 to pass through the light modulator layer, electrodes 34 and 38 may be formed from transparent conductive material. For example, electrodes 34 and 38 may be formed from a thin layer of silver or other metal (e.g., a layer sufficiently thin to be at least partly transparent to light), a transparent conductive material such as indium tin oxide, transparent conductive polymer such as poly(3,4-ethylenedioxythiophene) polystyrene sulfonate conductive polymer (PEDOT:PSS), nanostructures (e.g., carbon nanotubes), graphene (e.g., a monolayer of graphene), mesh-shaped layers (e.g., a metal mesh such as a silver mesh or other conductive layer with openings, etc.), or other conductive materials. These conductive electrode materials may be sufficiently flexible to resist cracking when strand 30 bends and stretches. Electrode layers and other layers of material in strand 30 may be deposited using printing, dipping, electroplating, physical vapor deposition, and/or other deposition and patterning techniques.

Material 36 may be electrochromic material (e.g., an electrochromic ink formed from particles or electrochromic dye that exhibits a chromic effect and that changes its color and light transmission characteristics when placed in a different electronic state by oxidation or reduction reactions) or may be a guest-host liquid crystal material (e.g., a material having a mixture of liquid crystal host molecules and anisotropic guest dye molecules that changes color and light transmission based on whether the liquid crystals (and therefore the guest dye molecules) are rotated into or out of alignment with rays of light 42.

One or more optional additional layers such as outer protective layer 40 may also be included in strand 30. For example, an outer protective layer of clear polymer may be formed on strand 30 such as a layer of polypropylene, polyamide (nylon), or other polymer.

Strands such as strand 30 may have any suitable diameter (e.g., 10-1000 microns, at least 20 microns, at least 100 microns, less than 3000 microns, less than 2000 microns, less than 500 microns, less than 100 microns, less than 75 microns, less than 50 microns, etc.). Strands 30 may be woven or otherwise intertwined with other strands of material to form fabric for a fabric-based item such as a wearable electronic device. Light-emitting strands such as illustrative strand 30 of FIG. 1 include light-emitting cores such as light-emitting core 32. If desired, a non-light-emitting core (e.g., a core formed from glass, metal, and/or polymer that does not emit light 42) may be used in forming strand 30.

Figure 2:
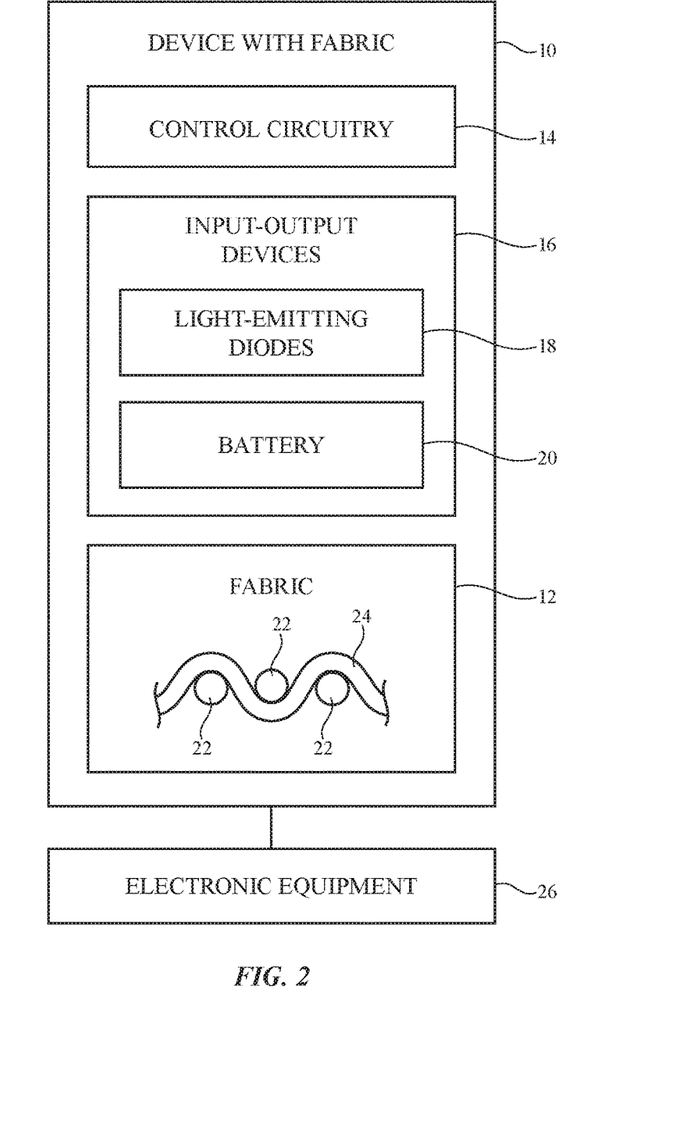
FIG. 2 is a schematic diagram of an illustrative fabric-based item in accordance with an embodiment.

An illustrative electronic device such as a wearable electronic device with fabric or other fabric-based item is shown in FIG. 2. Device 10 may be an electronic device or an accessory for an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a remote control, an embedded system such as a system in which device 10 is incorporated into a kiosk, automobile, airplane, or other vehicle, other electronic equipment, or equipment that implements the functionality of two or more of these devices. If desired, device 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable fabric-based item.

Device 10 may include intertwined strands of material that form fabric 12. Fabric 12 may form all or part of a housing wall or other layer in an electronic device, may form internal structures in an electronic device, or may form other fabric-based structures. Device 10 may be soft (e.g., device 10 may have a fabric surface that yields to a light touch), may have a rigid feel (e.g., the surface of device 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 12 may be single-filament strands (sometimes referred to as fibers or monofilaments), may be yarns or other strands that have been formed by intertwining multiple filaments (multiple monofilaments) of material together, or may be other types of strands. Monofilaments for fabric 12 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used.

Yarn in fabric 12 may be formed from polymer, metal, glass, graphite, ceramic, natural materials as cotton or bamboo, or other organic and/or inorganic materials and combinations of these materials. Conductive coatings such as metal coatings may be formed on non-conductive material. For example, plastic yarns and monofilaments in fabric 12 may be coated with metal to make them conductive. Reflective coatings such as metal coatings may be applied to make yarns and monofilaments reflective. Yarns may be formed from a bundle of bare metal wires or metal wire intertwined with insulating monofilaments (as examples).

Strands of material such as these and light-modulating strands such as strand 30 of FIG. 1 may be may be intertwined to form fabric 12 using intertwining equipment such as weaving equipment, knitting equipment, or braiding equipment. Intertwined strands may, for example, form woven fabric, knit fabric, braided fabric, etc. As shown in FIG. 2, for example, fabric 12 may be woven fabric that includes strands such as warp strands 22 and weft strands 24 and which may contain strands such as strand 30 and/or other strands of material. In the illustrative configuration of FIG. 2, fabric 12 has a single layer of woven strands. Multi-layer fabric constructions may be used for fabric 12 if desired. Woven fabric 12 may a plain weave, a basket weave, a satin weave, a twill weave, or variations of these weaves, may be a three-dimensional woven fabric, or may be other suitable fabric.

Conductive strands and insulating strands may be woven, knit, braided, or otherwise intertwined to form contact pads that can be electrically coupled to conductive structures in device 10 such as the contact pads of an electrical component (e.g., using solder or conductive adhesive). The contacts of an electrical component may also be directly coupled to an exposed metal segment along the length of a conductive yarn or monofilament.

In some configurations, conductive strands may also be woven, knit, or otherwise intertwined to form fabric with conductive paths. The conductive paths may be used in forming signal paths (e.g., signal buses, power lines, etc.), may be used in forming part of a capacitive touch sensor electrode, a resistive touch sensor electrode, or other input-output device, or may be used in forming other patterned conductive structures. Conductive structures in fabric 12 may be used in carrying power signals, digital signals, analog signals, sensor signals, control signals, data, input signals, output signals, or other suitable electrical signals.

Light-emitting strands such as strand 30 of FIG. 1 that contain light-emitting cores such as light-emitting core 32 and/or other strands 30 can be woven, knit, or otherwise intertwined to form light-emitting areas in fabric 12. These light-emitting areas may form decorative trim, interior lighting for a bag or other item, logos, keyboard key labels, button labels and trim, text, etc. In some configurations, patterned light-emitting areas formed from strands 30 in fabric 12 may be used in forming instructions or otherwise providing a user with guidance on the use of device 10. In other configurations, light-emitting areas formed from strands 30 may be used to form status indicators (e.g., an indicator in which an area of fabric 12 is illuminated to indicate how much power remains in a battery, to indicate a signal strength level for a wireless transceiver, to indicate a current volume level or other media playback status information as media is being played for a user of device 10, etc.). Light-emitting areas formed from one or more strands 30 may also be used to provide a user of device 10 with alerts (e.g., notifications) such as an alert that a message has been received, that a timer has expired, that a calendar entry is present for the current time/day, etc. In some configurations, small pixel-sized segments of strands 30 may be controlled individually. In these configuration, an area of fabric 12 in item 30 containing an array of pixels formed from strands 12 may be used in displaying images for a user.

Device 10 may include additional mechanical structures 14 such as polymer binder to hold strands in fabric 12 together, support structures such as frame members, housing structures (e.g., an electronic device housing), and other mechanical structures.

Input-output circuitry 16 may be included in device 10. Circuitry 16 may include electrical components that are coupled to fabric 12, electrical components that are housed within an enclosure formed by fabric 12, electrical components that are attached to fabric 12 using welds, solder joints, adhesive bonds (e.g., conductive adhesive bonds such as anisotropic conductive adhesive bonds or other conductive adhesive bonds), crimped connections, or other electrical and/or mechanical bonds. Circuitry 16 may include metal structures for carrying current, electrical components such as integrated circuits, light-emitting diodes (see, e.g., light-emitting diodes 18), battery 20, and other input-output devices (e.g., sensors, buttons, keyboards, track pads, capacitive touch sensors, and other electrical devices). Control circuitry 14 (e.g., control circuitry formed from one or more integrated circuits such as microprocessors, microcontrollers, application-specific integrated circuits, digital signal processors, etc.) may be used to control the operation of device 10 by controlling electrically controllable (electrically adjustable) components in circuitry 16 and may be used to support communications with external equipment such as electronic equipment 26.

Electronic equipment 26 may be attached to device 10 or device 10 and equipment 26 may be separate items that are configured to operate with each other (e.g., when one item is a case and the other is a device that fits within the case, etc.). Circuitry 16 may include antennas and other structures for supporting wireless communications with equipment 26. Equipment 26 may also interact with device 10 using a wired communications link or other connection that allows information to be exchanged.

In some situations, equipment 26 may be an electronic device such as a cellular telephone, computer, or other portable electronic device and device 10 may form a cover, case, bag, or other structure that receives the electronic device in a pocket, an interior cavity, or other portion of device 10. In other situations, equipment 26 may be a wrist-watch device or other electronic device and device 10 may be a strap or other fabric-based item that is attached to equipment 26 (e.g., device 10 and equipment 26 may be used together to form a fabric-based item such as a wrist-watch with a strap). In still other situations, device 10 may be an electronic device (e.g., a wearable device such as a wrist device, clothing, etc.), fabric 12 may be used in forming the electronic device, and additional equipment 26 may include accessories or other devices that interact with device 10. Signal paths formed from conductive yarns and monofilaments (e.g., insulated and bare wires) may be used to route signals in device 10 and/or equipment 26.

Device 10 may include non-fabric materials (e.g., structures that are formed from plastic, metal, glass, ceramic, crystalline materials such as sapphire, etc.). These materials may be formed using molding operations, extrusion, machining, laser processing, and other fabrication techniques. In some configurations, some or all of fabric-based device 10 may include one or more layers of material. The layers in device 10 may include layers of polymer, metal, glass, fabric, adhesive, crystalline materials, ceramic, substrates on which components have been mounted, patterned layers of material, layers of material containing patterned metal traces, thin-film devices such as transistors, and/or other layers.

Figure 3:
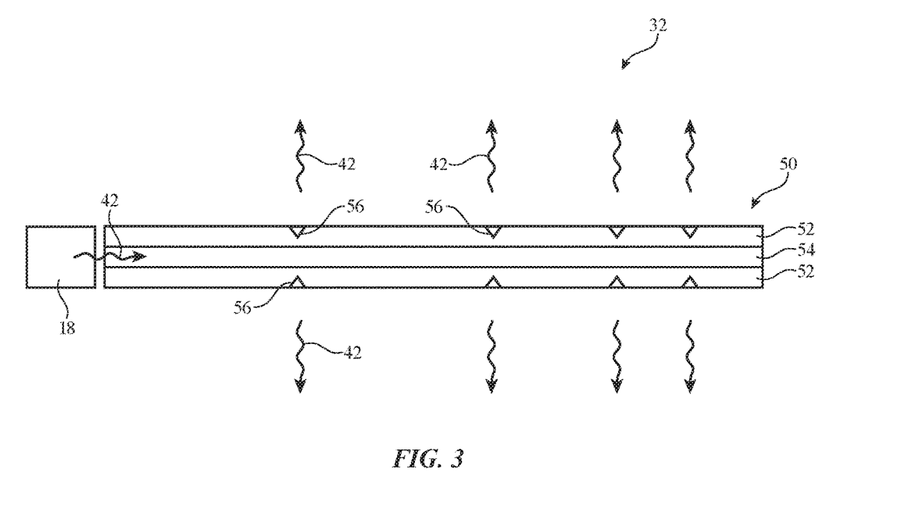
FIG. 3 is a side view of an illustrative light-emitting core strand formed from an illuminated optical fiber with light scattering structures in accordance with an embodiment.

FIG. 3 is a cross-sectional side view of light-emitting core 32 in an illustrative configuration in which core 32 has been formed from optical fiber 50. Optical fiber 50 may be formed from transparent materials such as plastic or glass. Optical fiber 50 may have fiber core 54 and fiber cladding 52, which surrounds fiber core 54. Fiber core 54 may have a higher index of refraction than fiber cladding 52 so that light 42 that has been emitted into the end of fiber 50 from light-emitting diode 18 will be guided in fiber 54 in accordance with the principal of total internal reflection. Light-scattering features 56 (e.g., pits, bumps, embedded particles, etc.) may be formed along the length of fiber 50 to help scatter light 42 out of fiber core 54. In this way, light 42 may be emitted radially as shown in the cross-sectional view of strand 30 of FIG. 1.

Figure 4:
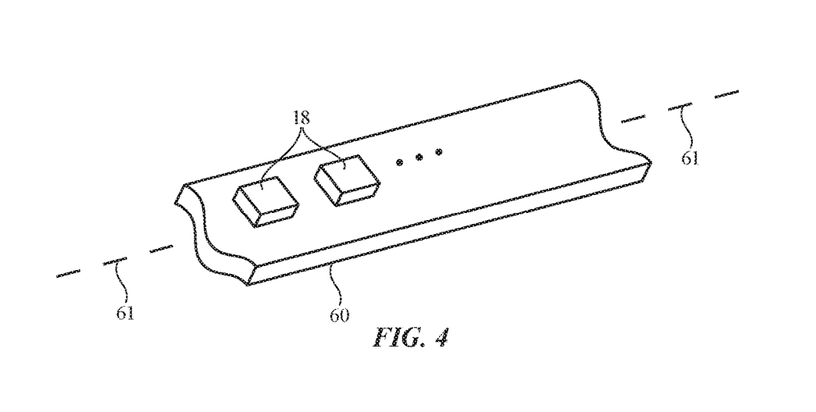
FIG. 4 is a perspective view of light-emitting diodes mounted to an illustrative flexible substrate in accordance with an embodiment.
Figure 5:
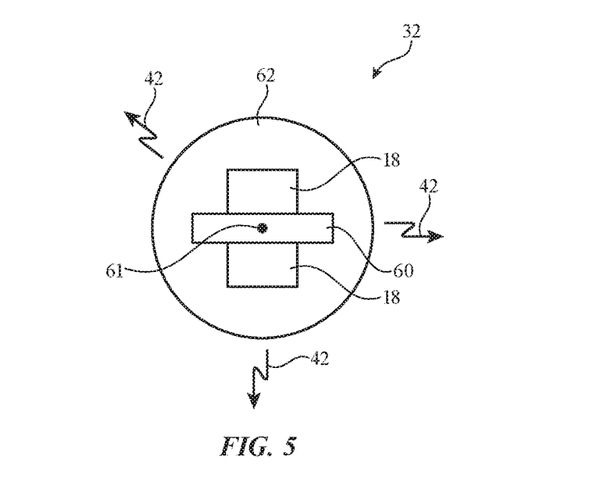
FIG. 5 is a cross-sectional view of an illustrative strand with a circular cross-sectional shape having embedded light-emitting diodes on a flexible substrate such as the flexible substrate of FIG. 4 in accordance with an embodiment.

Another illustrative arrangement for forming light-emitting core 32 is shown in FIGS. 4 and 5. In this type of configuration, light-emitting diodes 18 are mounted along the length of an elongated substrate such as substrate 60 (e.g., a flexible printed circuit formed from a layer of flexible polymer such as a polyimide layer). Substrate 60 may be characterized by a longitudinal axis 61. Diodes 18 may have contacts (solder pads) that are soldered or otherwise electrically and mechanically coupled to mating contacts (e.g., solder pads formed from metal traces) on substrate 60. Light-emitting diodes 18 may be mounted on opposing upper and lower surfaces of substrate 60. As shown in FIG. 5, following the attachment of light-emitting diodes 18 to substrate 60, substrate 60 may be covered with a protective polymer coating such as coating 62 (e.g., a clear polymer that permits light 42 emitted by diodes 18 to escape).

Figure 6:
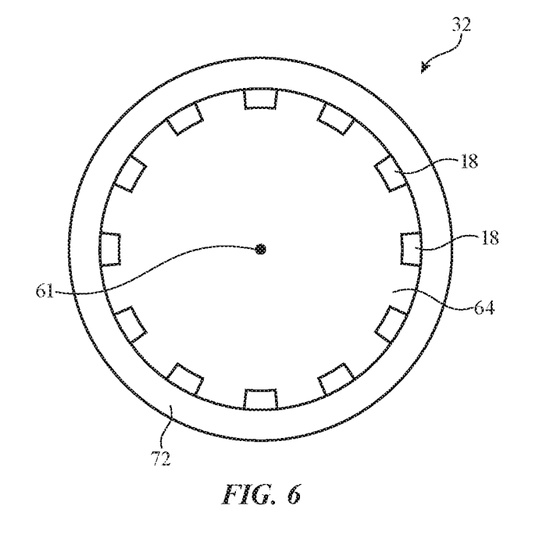
FIGS. 6, 7, and 8 are cross-sectional views of illustrative mounting arrangements for light-emitting diodes in a strand in accordance with embodiments.

In the example of FIG. 6, light-emitting diodes 18 have been mounted (e.g., soldered) to metal traces in polymer core (core strand) 64. Polymer core strand 64 may serve as a substrate for light-emitting diodes 18 and may include metal traces with contact pads to receive solder and thereby couple to solder pads or other contacts (terminals) of light-emitting diodes 18. Core strand 64 may have a cross-sectional profile that is circular, polygonal, rectangular, hexagonal, or that has any other suitable profile shape. If desired, a protective layer of material such as clear polymer 72 may be formed on top of core strand 64 and light-emitting diodes 18 (e.g., to help encapsulate light-emitting diodes 18 before forming additional structures of the type shown in FIG. 1.

Figure 7:
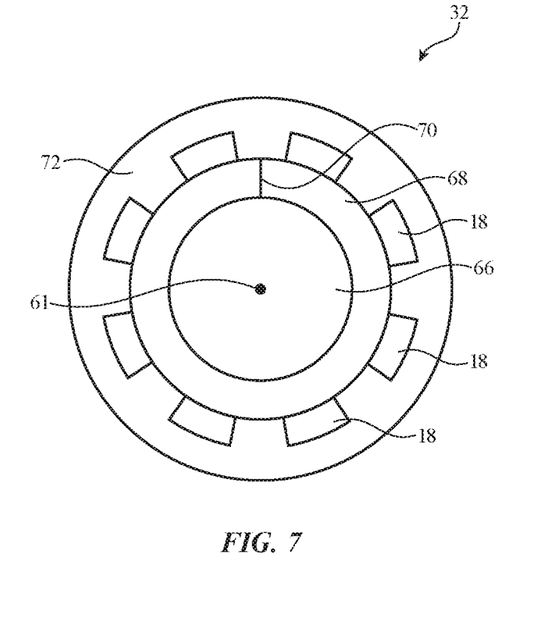

If desired, light-emitting core strand 32 may be formed by wrapping a strip of flexible printed circuit substrate material into a tube, as shown in FIG. 7. As shown in FIG. 7, light-emitting diodes 18 may be mounted to one of the surfaces of substrate 68 (e.g., a flexible printed circuit). Substrate 68 may have an elongated strip shape (extending into the page of FIG. 7). After light-emitting diodes 18 have been soldered or otherwise mounted to substrate 68, substrate 68 can be wrapped into a tube shape surrounding core strand 66. Core strand 66 may be, for example, a strand of polymer with a circular cross-sectional shape. Adhesive and/or heat and pressure may be used in coupling flexible printed circuit substrate 68 to the outer surface of core strand 66. Core strands such as core strands 64 of FIG. 6 and core strand 66 of FIG. 7 may be formed from polymer such as polyamide (nylon), poly-paraphenylene terephthalamide (Kevlar®), or other polymers. After core strand 66 has been wrapped with substrate 68, the left and right edges of substrate 68 will join at seam 70, which extends along the length of strand 66 (e.g., parallel to longitudinal strand axis 61).

Figure 8:
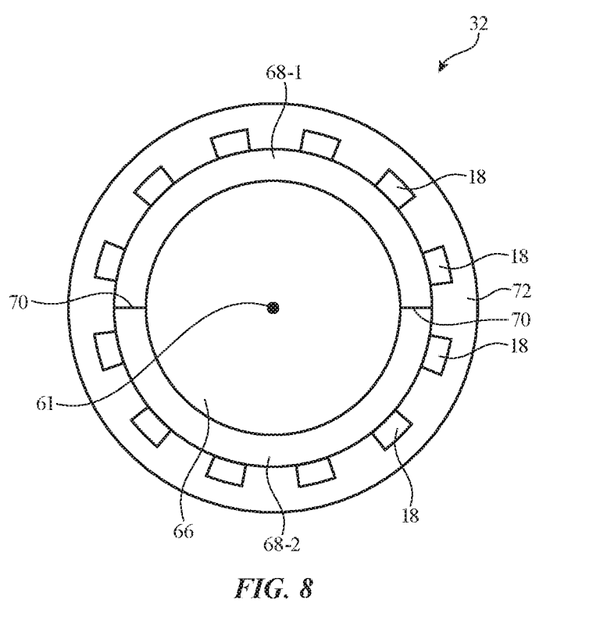

As shown in FIG. 8, light-emitting diodes 18 may be mounted onto first and second elongated substrates 68-1 and 68-2 (e.g., flexible printed circuits). After light-emitting diodes 18 have between soldered to the traces of substrates 68-1 and 68-2, a heated die or other tool may be used to press substrates 68-1 and 68-2 onto the outer surface of polymer core strand 66. Adhesive and/or heat and pressure from the die may curve substrate 68-2 downward onto the upper surface of core strand 66 and may curve substrate 68-2 upward onto the lower surface of core strand 66, producing two longitudinal seams 70 running along the length of light-emitting core 32 parallel to longitudinal axis 61.

Figure 9:
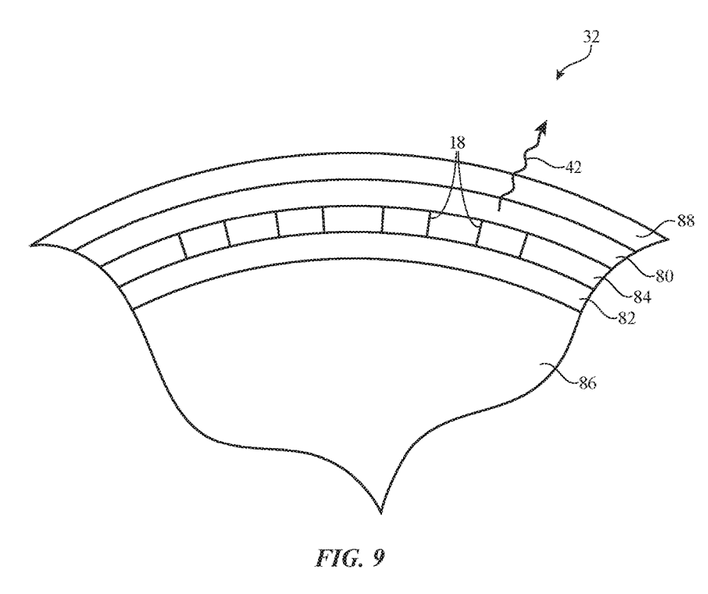
FIG. 9 is a cross-sectional view of an illustrative illuminated strand with light-emitting diodes coupled between inner and outer coaxial electrodes formed from layers of conductive material in accordance with an embodiment.

FIG. 9 is a cross-sectional side view of a portion of light-emitting core 32 in an illustrative configuration in which light-emitting diodes 18 have been interposed between an inner electrode such as inner conductive layer 82 and an outer electrode such as outer conductive layer 80 (e.g., electrodes 80 and 82 may be coaxial). Inner conductive layer 82 may be formed on core strand 86. Core strands such as core strand 86 may be formed from polymer such as polyamide (nylon), poly-paraphenylene terephthalamide (Kevlar®), or other polymer. Inner conductive layer 82 may be formed from a layer of silver or other metal, a conductive polymer such as poly(3,4-ethylenedioxythiophene) polystyrene sulfonate conductive polymer (PEDOT:PSS), nanostructures (e.g., carbon nanotubes), graphene (e.g., a monolayer of graphene), mesh-shaped layers (e.g., a metal mesh such as a silver mesh or other conductive layer with openings, etc.), or other conductive materials. Inner conductive layer 82 is formed in the interior of light-emitting core strand 32 and therefore need not be transparent. Outer conductive layer 80 may be transparent to allow light 42 from light-emitting diodes 18 to pass. If desired, an outer layer such as layer 88 may be formed on outer layer 80 to form a protective outer layer for device 10.

In the illustrative configuration of FIG. 9, layers 82 and 84 may be formed from blanket films (e.g., layers 82 and 84 need not be patterned to form individual conductive lines and contact pads). Light-emitting diodes 18 may be deposited onto the exterior surface of inner electrode 82 in the form of a slurry (e.g., layer 84, which may be a mixture of light-emitting diode dies and a liquid carrier). Light-emitting diodes 18 may be GaN diodes or other suitable semiconductor light-emitting diodes. Light-emitting diodes 18 may be formed from semiconductor dies having dimensions of 10-60 microns, at least 10 microns, less than 100 microns, less than 40 microns, less than 30 microns, or other suitable size. Each die may have a positive contact and a negative contact. When depositing the dies of diodes 18 in a slurry, some of the dies will have their positive and negative contacts oriented for forward biasing as a voltage is applied across layers (electrodes) 82 and 84 and some of the dies will be oriented for reverse biasing (and will therefore not emit light when voltage is applied). There may be a sufficient number of diodes 18 in layer 84 that the presence of some non-active (reverse-biased) light-emitting diodes 18 among the active (forward-biased) light-emitting diodes 18 will not significantly degrade the light output from core 32.

Layer 84 may be formed on the exterior of layer 82 using a technique such as printing, dipping, spraying, etc. Heat may be applied to layer 84 to remove excess liquid. Outer layer 84 may be formed by depositing a conductive coating onto layer 84. Optional protective outer layer 88 (e.g., a clear polymer layer) may be used to protect the exterior of light-emitting core strand 32. Layer 88 may be transparent to allow light 42 to pass to through layer 88 from light-emitting diodes 18.

If desired, light-emitting diode structures for layer 84 may be formed using other arrangements (e.g., by depositing organic light-emitting diodes in the form of coatings between electrodes 82 and 80, by using ZnO structures or other semiconductor structures to form light-emitting diodes in layer 84, and/or using other light-emitting diode structures to form light-emitting diodes to emit light 42 from strand 32).

After forming a light-emitting core for strand 30 such as light-emitting cores 32 of FIGS. 3, 4, 5, 6, 7, 8, and 9, strand 30 can be electrically controlled to produce light 42 of desired intensity and/or color. Control circuitry 14 may, for example, control the intensity of light 42 that is produced by light-emitting diodes 18 by adjusting the amount of current flowing through diodes 18. Control signals for diodes 18 may be supplied to light-emitting diodes 18 from control circuitry 14 using signal lines (e.g., metal traces) in flexible printed circuits or other substrates to which diodes 18 are coupled and/or using electrodes such as electrodes formed from layers 82 and 80 of FIG. 9. The color and intensity of light 42 that is emitted from strand 30 can also be adjusted by controlling the light modulation effects produced by the light-modulation layer of strand 30 (e.g., by using control circuitry 14 to apply control signals to inner light modulator layer electrode 34 and outer light modulator electrode 38 of FIG. 1).

Figure 10:
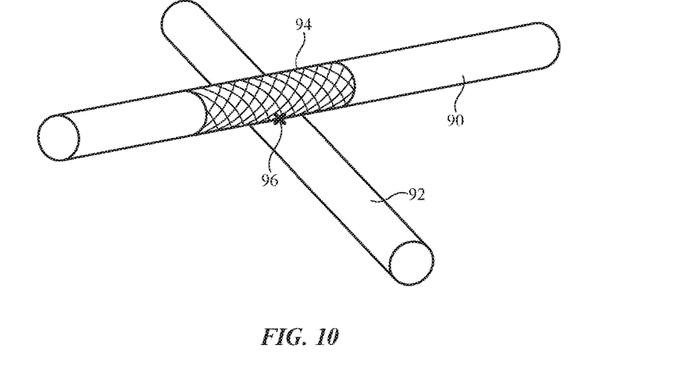
FIG. 10 is a perspective view of an illustrative overlapping strand configuration that may be used in controlling the appearance of strands in fabric in accordance with an embodiment.

FIG. 10 is a perspective view showing how strands in fabric 12 may cross each other (e.g., warp and weft strands may be oriented perpendicularly to each other). In this type of arrangement, signals that are distributed using one strand can be used in controlling the operation of a localized portion of a crossing strand. Consider, as an example, a scenario in which strand 90 is a light-emitting strand such as strand 30 of FIG. 1. In this scenario, the signal applied to outer electrode 38 may be provided to outer electrode 38 from an outer conductive layer of a crossing strand such as strand 92. Strand 92 may, for example, cross strand 90 at a right angle as shown in FIG. 10 and may form an electrical contact such as electrical contact 96 where the outer conductive layer of strand 92 crosses and contacts the outer conductive electrode of strand 90 (e.g., electrode 38 of FIG. 1 in a scenario in which some or all of outer protective layer 40 has been removed or omitted).

Inner electrode 34 may be held at a fixed potential (e.g., ground). When a signal is applied to the outer conductive layer in strand 92 (e.g., a positive signal), this signal will be applied to a localized portion of outer electrode 38 in strand 90 in the vicinity of contact 96 such as region 94. In region 94, there will be a sufficient signal across electrodes 38 and 34 of strand 90 to modify the light transmission properties and/or color of layer 36 between electrodes 38 and 34. In this way, a pixel-sized region of strand 90 (e.g., region 94) may be selectively adjusted to exhibit different amounts of light transmission and/or different colors. If desired, the properties of strands 30 may be varied along their lengths (e.g., to create segments of strands 30 that emit different colors of light when the light is unmodulated). In this type of scenario, regions such as regions 94 may be aligned with the segments of different colors (e.g., red, green, and blue), allowing control circuitry 12 to regulate the output of red, green, and blue light (as an example).

Figure 11:
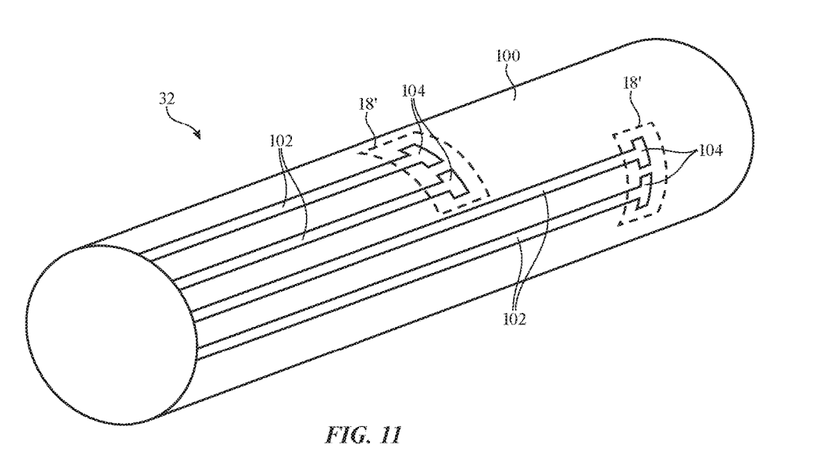
FIG. 11 is a perspective view of an illustrative strand with longitudinal conductive paths for supplying signals to components such as light-emitting diodes in accordance with an embodiment.

If desired, light 42 emitted from core 32 can be adjusted in segments. For example, core 32 may have patterned signal lines (e.g., metal traces 102) and associated contacts such as solder pads 104 on a polymer core such as core 100 to which light-emitting diodes 18 are soldered in locations 18'. During operation, control circuitry 12 can provide individually adjusted control signals to different light-emitting diodes 18 by using appropriate signal lines 102.

The foregoing is merely illustrative and various modifications can be made to the described embodiments. The foregoing embodiments may be implemented individually or in any combination.

What is claimed is:

1. A fabric-based item comprising:
 a layer of fabric formed from intertwined strands including a strand having:
  a light-emitting core configured to emit light;
  an electrochromic light modulator layer surrounding the light-emitting core, wherein the electrochromic light modulator layer has coaxial inner and outer electrodes and has electrochromic material between the inner and outer electrodes; and
 control circuitry that is configured to adjust transmission of the light through the electrochromic light modulator layer by applying a signal to the electrochromic material using the inner and outer electrodes.

2. The fabric-based item defined in claim 1 wherein the light-emitting core comprises:
 a polymer core strand;
 a first conductive layer on the polymer core strand;
 a second conductive layer; and
 light-emitting diodes between the first and second conductive layers.

3. The fabric-based item defined in claim 2 wherein the second conductive layer comprises transparent conductive material.

4. The fabric-based item defined in claim 3 wherein the inner and outer electrodes comprise transparent conductive material.

5. The fabric-based item defined in claim 4 further comprising a transparent polymer layer, wherein the light modulator layer is interposed between the light-emitting core and the transparent polymer layer.

6. The fabric-based item defined in claim 1 wherein the light-emitting core comprises:
 a polymer core strand;
 signal lines on the polymer core strand that have portions that form contacts; and
 light-emitting diodes coupled to the contacts.

7. The fabric-based item defined in claim 1 wherein the strands include a conductive strand, wherein the outer electrode is electrically coupled to the conductive strand, and wherein the control circuitry is configured to adjust a portion of the electrochromic material in the light modulator layer by applying a signal to the conductive strand.

8. The fabric-based item defined in claim 1 wherein the layer of fabric is woven fabric and wherein the fabric-based item further comprises a battery.

9. The fabric-based item defined in claim 1 wherein the light-emitting core comprises an optical fiber.

10. An electronic device, comprising:
 a strand having a light-emitting core, wherein the light-emitting core comprises:
  a polymer core strand;
  light-emitting diodes configured to emit light;
  coaxial first and second conductive layers, wherein the first conductive layer is formed on the polymer core strand and wherein the light-emitting diodes are interposed between the first and second conductive layers; and
 control circuitry that is configured to adjust the light-emitting diodes by applying a signal to the light-emitting diodes using the first and second conductive layers.

11. The electronic device defined in claim 10 wherein the strand further comprises:
a light modulator layer surrounding the light-emitting core, wherein the control circuitry is configured to adjust transmission of the emitted light through the light modulator layer by applying a signal to the light modulator layer.

12. The electronic device defined in claim 11 wherein the strand is intertwined with additional strands to form fabric.

13. The electronic device defined in claim 11 wherein the light modulator layer has coaxial inner and outer electrodes and wherein the control circuitry is configured to apply the signal using the inner and outer electrodes.

14. The electronic device defined in claim 13 wherein the light modulator layer comprises a layer of electrochromic material between the inner and outer electrodes.

15. The electronic device defined in claim 13 wherein the light modulator layer comprises a layer of liquid crystal material between the inner and outer electrodes.

16. The electronic device defined in claim 13 wherein the inner and outer electrodes comprise transparent conductive material.

17. The electronic device defined in claim 13 wherein the strand further comprises a transparent polymer layer and wherein the light modulator layer is interposed between the light-emitting core and the transparent polymer layer.

18. A fabric-based item comprising:
a layer of fabric formed from intertwined strands including a strand having:
a light-emitting core configured to emit light;
a liquid crystal light modulator layer surrounding the light-emitting core, wherein the liquid crystal light modulator layer has coaxial inner and outer electrodes and liquid crystal material between the inner and outer electrodes; and
control circuitry that is configured to adjust transmission of the light through the liquid crystal light modulator layer by applying a signal to liquid crystal material using the inner and outer electrodes.

19. The fabric-based item defined in claim 18 wherein the light-emitting core comprises an optical fiber and a light-emitting diode coupled to the optical fiber and wherein the control circuitry is configured to adjust the light emitted from the light-emitting core by adjusting the light-emitting diode.

20. The fabric-based item defined in claim 18 wherein the light-emitting core comprises:
a polymer core strand;
a first conductive layer on the polymer core strand;
a second conductive layer; and
light-emitting diodes between the first and second conductive layers.

* * * * *